(12) United States Patent
Russell et al.

(10) Patent No.: US 6,947,640 B2
(45) Date of Patent: Sep. 20, 2005

(54) ALIGNMENT AND IMAGING SYSTEM FOR WRITING BRAGG GRATINGS

(75) Inventors: Jerin J. Russell, Ellington, CT (US); John R. Troll, Baltimore, MD (US); Joseph F. Pinto, Wallingford, CT (US); Freddie Falero, Jr., Wallingford, CT (US); Minfu Lu, Wallingford, CT (US); Trevor W. MacDougall, Simsbury, CT (US); Francesco Birritta, Wethersfield, CT (US); Duane J. Rodriguez, Stafford Springs, CT (US)

(73) Assignee: Cidra Corporation, Wallingford, CT (US)

( * ) Notice: Subject to any disclaimer, the term of this patent is extended or adjusted under 35 U.S.C. 154(b) by 0 days.

(21) Appl. No.: 10/459,687

(22) Filed: Jun. 10, 2003

(65) Prior Publication Data

US 2004/0105623 A1 Jun. 3, 2004

Related U.S. Application Data

(60) Provisional application No. 60/387,798, filed on Jun. 10, 2002.

(51) Int. Cl.$^7$ ............................ G02B 6/34; H01L 21/00
(52) U.S. Cl. ........................... 385/37; 385/52; 385/136; 385/137; 438/32
(58) Field of Search ............................ 385/37, 31, 52, 385/14, 136, 137; 438/31, 32

(56) References Cited

U.S. PATENT DOCUMENTS

| | | | | |
|---|---|---|---|---|
| 6,249,624 B1 | * | 6/2001 | Putnam et al. .................. | 385/37 |
| 6,298,184 B1 | * | 10/2001 | Putnam et al. .................. | 385/37 |
| 6,483,965 B1 | * | 11/2002 | Napier et al. ................... | 385/37 |
| 6,548,225 B1 | * | 4/2003 | Hammon et al. ............ | 430/321 |
| 6,553,163 B2 | * | 4/2003 | Tormen ........................ | 385/37 |
| 6,591,039 B2 | * | 7/2003 | Rondinella et al. ........... | 385/37 |
| 2002/0114553 A1 | * | 8/2002 | Mead et al. .................... | 385/10 |
| 2002/0136489 A1 | * | 9/2002 | Tallone ......................... | 385/24 |
| 2003/0007729 A1 | * | 1/2003 | Rondinella et al. ........... | 385/37 |
| 2003/0059165 A1 | * | 3/2003 | Belmonte et al. .............. | 385/37 |
| 2003/0156791 A1 | * | 8/2003 | De Groot ...................... | 385/37 |
| 2004/0005116 A1 | * | 1/2004 | Sweetser et al. .............. | 385/37 |

FOREIGN PATENT DOCUMENTS

EP    0 890 851 A2    1/1999   ............... 385/37 X

OTHER PUBLICATIONS

F. Kozo, "Mask Positioning Device," Patent Abstracts of Japan, Publication No. 11326667.

N. F. Schmitt et al., "Photo–induced Gratings in Large Diameter Multimode Plastic Optical Fibres," IEE 1997, pp. 1–5, Savoy Place, London UK.

G. Peng et al., "Dye–Doped Step–Index Polymer Optical Fiber for Broadband Optical Amplification", Journal of Lightwave Technology, vol. 14, No. 10, Oct. 1996, pp. 2214–2223.

* cited by examiner

*Primary Examiner*—Brian M. Healy

(57) ABSTRACT

A method is provided for precise and repeatable location of one or more Bragg gratings in a large diameter optical waveguide having a cross-section of at least about 0.3 millimeters, featuring the steps of: defining a reference location on a fixed placement datum arranged on a waveguide fixture device; defining one or more desired locations on a large diameter optical waveguide arranged on the waveguide fixture location in relation to the reference location; and writing one or more Bragg gratings in the large diameter optical waveguide at the one or more desired locations based on the reference location on the fixed placement datum. The step of defining the reference location may include marking the fixed placement datum with a scribe mark thereon; and securing the fixed placement datum in a groove in a waveguide fixture device.

9 Claims, 4 Drawing Sheets

ALIGNMENT AND IMAGING SYSTEM FOR WRITING BRAGG GRATINGS

CROSS-REFERENCE TO RELATED APPLICATIONS

This application claims benefit to provisional patent application Ser. No. 60/387,798, filed Jun. 10, 2002 (CC-0325).

BACKGROUND OF THE INVENTION

1. Technical Field

The present invention generally relates to a method and apparatus for writing a grating; and more particularly to a method and apparatus for writing a grating in a large diameter optical waveguide (also known hereinafter as "cane" or "cane element").

2. Description of Related Art

If any collocated grating is written beyond the end of the uniform strain region in either or both ends of the ground region of the element, the grating(s) will chirp under compression. However, the longest possible grating is desired for the filter shape properties. For this reason, the placement tolerance of the grating has been reduced to the smallest possible value.

SUMMARY OF THE INVENTION

In its broadest sense, the present invention provides a new and unique method for precise and repeatable location of one or more Bragg gratings in a large diameter optical waveguide having a cross-section of at least about 0.3 millimeters. The method features the steps of: defining a reference location on a fixed placement datum arranged on a waveguide fixture device; defining one or more desired locations on a large diameter optical waveguide arranged on the waveguide fixture device in relation to the reference location; and writing one or more Bragg gratings in the large diameter optical waveguide at the one or more desired locations based on the reference location on the fixed placement datum.

The step of defining the reference location may include marking the fixed placement datum with a scribe mark thereon; and securing the fixed placement datum in a groove in the waveguide fixture device.

The step of defining one or more desired locations includes abutting an end surface of the large diameter optical waveguide against a corresponding end surface of the fixed placement datum.

The step of defining the reference location includes viewing the reference location on the fixed placement datum with a camera; aligning a crosshair of the camera on the reference location; and clicking an icon on a computer program screen to store coordinates of the reference location. The step of defining the reference location may also include centering axially an intersection of two writing beams on the reference location along the X, Y and Z axis at an inner core of the large diameter optical waveguide; and determining a desired intersection based on the brightness of an illuminated oval.

The step of defining the one or more desired locations includes viewing the one or more desired locations on the large diameter optical waveguide with a camera; aligning a crosshair of the camera on the one or more desired locations; and clicking an icon on a computer program screen to store coordinates of the one or more desired locations. The step of defining the one or more desired locations may also include centering axially an intersection of two writing beams on the reference location along the X, Y and Z axis at an inner core of the large diameter optical waveguide; and determining a desired intersection based on the brightness of an illuminated oval.

The large diameter optical waveguide or cane has at least one inner core with a Bragg grating arranged therein and a cladding surrounding the at least one inner core.

In effect, by using an imaging system running vision software, an optimum fringe visibility can be determined. The imaging system is first used to align a laser beam to a center position of the Bragg grating using a witness or reference element with a precision placed scribe mark and the vision software. The witness or reference element may be any block of material, including another large diameter optical waveguide. The laser beam is then reduced to a small spot using an aperture. The resulting image as viewed by a camera of the imaging system will be a pattern with two lines through the witness or reference element. When the two lines form an "X" centered at the core of the large diameter optical waveguide, the fringe visibility will be optimized. The same procedure may be taken for locating the one or more desired locations on the large diameter optical waveguide in which the one or more gratings are written.

This imaging system and vision software may also be used as a diagnostic tool during the grating writing process to determine if the Bragg grating is centered in the length of the large diameter optical waveguide.

One advantage of the present invention is that it minimizes the chirping of co-located gratings, which would not otherwise appear until a final system assembly and test.

The vision system of the present invention must be utilized as an essential tool for the proper alignment of the beam train. This is most important in the alignment of the interferometer to prevent blaze, chirp and other alignment issues of the phase mask image that is projected to the core of the waveguide element. The vision system also increases the precise setting of z-distance of the element core (also useful in the case of fiber for all of the previous cases). This tool is one of the important improvements for optimizing the visibility function.

The foregoing and other objects, features and advantages of the present invention will become more apparent in light of the following detailed description of exemplary embodiments thereof.

BRIEF DESCRIPTION OF THE DRAWING

The drawing, not drawn to scale, includes the following Figures.

BEST MODE FOR CARRYING OUT THE INVENTION

Figure 1:
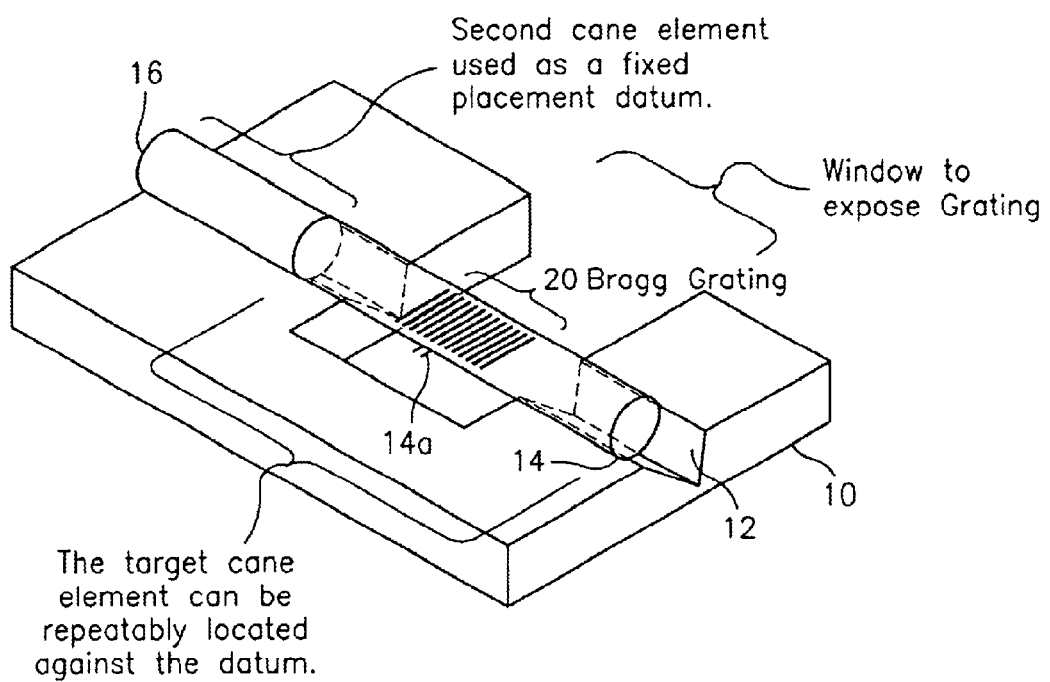
FIG. 1 is a perspective view of a waveguide fixture or holder device having a V-groove with a large diameter optical waveguide and fixed placement datum arranged thereon according to the present invention.

FIG. 1 shows a waveguide fixture or holder device generally indicated as 10 having a V-groove 12 with a large diameter optical waveguide 14 and a fixed placement datum 16 arranged thereon according to the present invention. As shown, the large diameter optical waveguide 14 has a Bragg grating 20 written therein using the method according to the present invention, which features the steps of defining a reference location or scribe 16a on the fixed placement datum 16; defining one or more desired locations generally indicated as 14a on the large diameter optical waveguide 14 in relation to the reference location 16a; and writing one or more Bragg gratings 20 in the large diameter optical waveguide 16 at the one or more desired locations 14a based on the reference location 16a on the fixed placement datum 16. As shown, a second large diameter optical waveguide or cane element is used as the fixed placement datum 16. The scribe is a partial circumferential scribe that is made around at least a portion of the outer diameter of the fixed placement datum 16. The targeted cane element 14 can be repeatedly located against the datum 16. FIG. 1 also shows in dashed lines a window 20 to expose the grating.

Procedure

The following are the steps for using an imaging system running the vision software, as follows:

Step 1.0: Laser Warm-up
Step 2.0: Align laser system
Steps 3.0: Aligning the Video Camera (not shown)
 Step 3.1: Jog the slide so it is centered on an aperture.
 Step 3.2: Place the scribed witness or reference piece of cane in the waveguide fixture or holder device. Make certain that the scribed line is rotated toward the top so the camera can view it.
 Step 3.3: Open all shutters.
 Step 3.4: Click the laser beam icon on the desktop computer.
 Step 3.5: Click a continually capture logo on the program screen.
 Step 3.6: Click a stop logo on the programming screen.
 Step 3.7: Click a define center logo for defining the center.
 Step 3.8 Align the crosshair of the camera on the scribe mark and click on it.
 Step 3.9: Click a continually capture logo on the programming screen.
 Step 3.10: Click a stop logo of the programming screen.
 Step 3.11: Close the aperture. This will completely block all unwanted scatter from image.
 Step 3.12: Click define a beam spot on the programming screen. With the crosshair on the left edge of the beam, click and drag to the right edge of the beam. This crops the beam image.
 Step 3.13: Click a continually capture logo on the programming screen.
 Step 3.14: Click a stop logo on the programming screen.
 Step 3.15: Find the beam spot center.
 Step 3.16: Note the beam position (off center) in millimeters.
 Step 3.17: Click a continual capture logo on the programming screen to confirm that the jog was in the correct direction. The beam position should be as close to center (three decimal values) as possible. To center the scribe mark on the beam, move the Z axis stage to the left and right positions.
 Step 3.18: When the center position has been achieved, jog the slide half of the distance in the plus direction. This will be define a new home position.
Steps 4.0: Place element in beam train and expose
 Step 4.1: Place the cane element in the holder and place holder on the Z axis fixture.
 Step 4.2: Close all plexiglas covers around Z stage, interferometer and phase mask to minimize air currents through the cell during actual writing.
 Step 4.3: Determine grating writing set points.
 Step 4.4: Click update to define grating writing set points.
 Step 4.5: Click the align logo. Click the run logo 3–4 times to run the autoalign.
 Step 4.6: Click the Prod. logo. Start the vision software. The grating writing will begin.
Step 5.0: When the writing period is complete (approx. 2 min.), the shutter will close automatically.
Step 6.0: Slide rear plastic cover away to expose cane holder. Remove cane holder from Z-axis fixture.
Step 7.0: Remove cane from holder.
Step 8.0: Transport to test area to have grating checked against pre-anneal specification.
Step 9.0: Enter grating writing data into archive database.

FIG. 2a

Figure 2A:
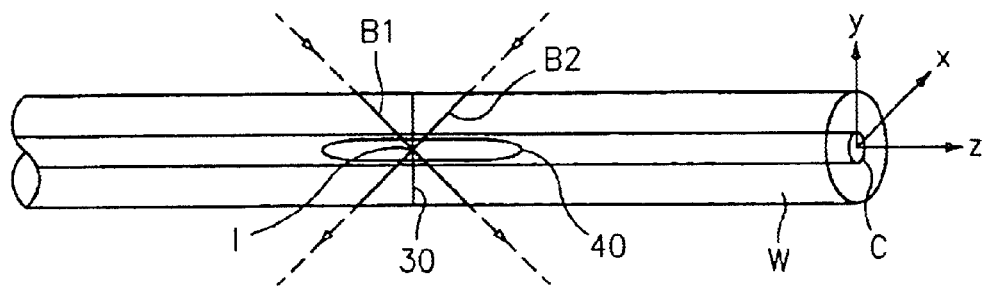
FIG. 2a is a diagram of a large diameter optical waveguide having two lines forming an illuminated "X" centered at a scribe and the inner core thereof.

FIG. 2(a) shows an intersection I of 2 writing beams generally indicated as B1, B2 being centered axially on a scribe 30 along the z-axis of the waveguide W because the center of an illuminated oval 40 is located at the scribe 30. In addition, the intersection I of the writing beams B1, B2 is centered along both the x-axis and y-axis at the core C of the waveguide W as indicated by a bright illuminated "X" across the waveguide W. The oval 40 is the brightest and largest and the "X" is the brightest when the intersection I of the writing beams B1, B2 is centered along the x-axis and y-axis at the core C of the waveguide W.

Figure 2B:
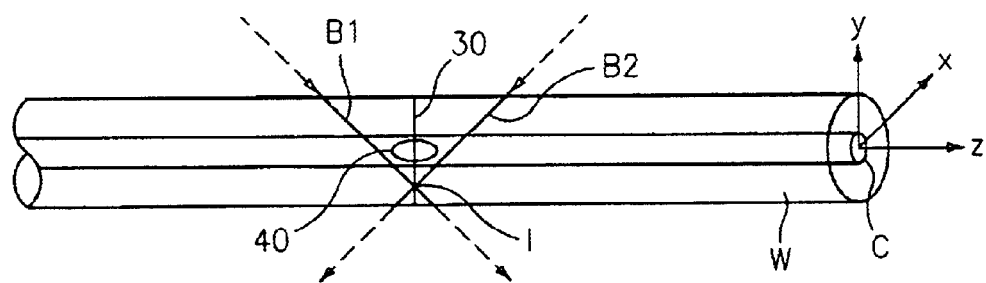
FIG. 2b is a diagram of a large diameter optical waveguide having two lines forming an illuminated "X" centered at the scribe but below the inner core thereof.

FIG. 2(b) shows an intersection I of the 2 writing beams B1, B2 being centered axially on the scribe 30 along the Z-axis but having the intersection I located below the core C along the y-axis of the waveguide W, as indicated by the illuminated off-centered "X" across the waveguide W. In that case, the "X" is not illuminated as bright as in FIG. 2(a) because the intersection I of the writing beams B1, B2 is not centered along the y-axis of the waveguide (where the core C is located). In addition, the oval 40 is small and faint, due to lack of alignment of the writing beams B1, B2 at the core C of the waveguide W.

Figure 2C:
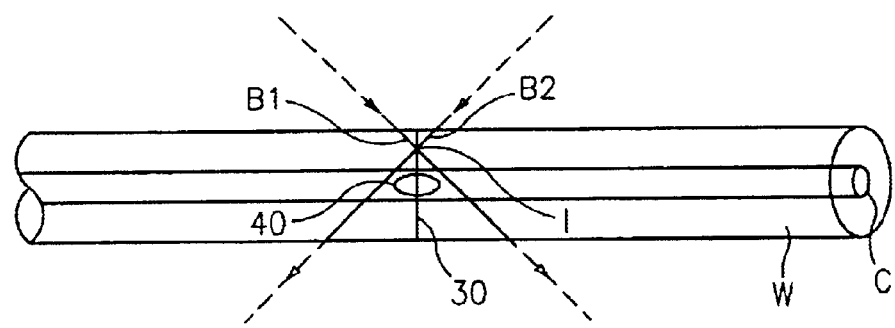
FIG. 2c is a diagram of a large diameter optical waveguide having two lines forming an illuminated "X" centered at the scribe but above the inner core thereof.

FIG. 2(c) shows an intersection I of the 2 writing beams B1, B2 being centered axially on the scribe 30 along the Z-axis but having the intersection I located above the core C along the y-axis of the waveguide W, as indicated by the illuminated off-centered "X" across the waveguide W. In that case, again the "X" is not illuminated as bright as in FIG. 2(a) because the intersection I of the writing beams B1, B2 is not centered along the y-axis of the waveguide W (where the core C is located). In addition, the oval 40 is small and faint, due to lack of alignment of the writing beams B1, B2 at the core C of the waveguide W.

Figure 2D:
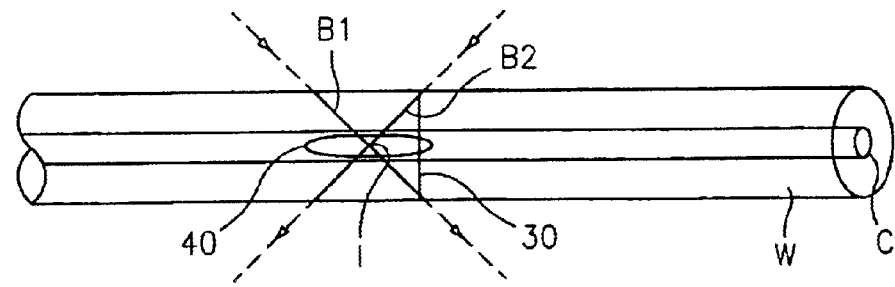
FIG. 2d is a diagram of a large diameter optical waveguide having two lines forming an illuminated "X" centered at the inner core thereof, but not center at the scribe.

FIG. 2(d) shows an intersection I of the 2 writing beams B1, B2 centered along both the x-axis and y-axis at the core C of the waveguide W as indicated by a bright illuminated "X" across the waveguide W. However, the intersection I of the 2 writing beams B1, B2 and the oval 40 that surrounds it are not located at the scribe 30 on the waveguide W, i.e., the axial center of the illuminated oval 40 is not located at the scribe 30. In that case, the "X" is illuminated as bright as in FIG. 2(a) and the oval 40 is large and bright, however the axial location of the center of the writing beam B1, B2 is not in the proper axial position.

Note that for the above Figures, the waveguide W is viewed from along the x-axis, perpendicular to the path of the writing beams B1, B2. While viewing along the "X" and oval along x-axis are permissible, the imaging is better for determining both x-axis and y-axis alignment with the core if the waveguide is viewed from angle between the X-axis and the Y-axis, e.g., 15 degrees from the X-axis toward the Y-axis. Other angles may be used if desired. Alternatively, a plurality of imaging devices may be used to optimize the writing beam alignment on the waveguide. For example, the waveguide may be viewed from along the x-axis as well as along an angle (e.g., 15 degrees) between the X-axis and Y-axis.

Figure 3:
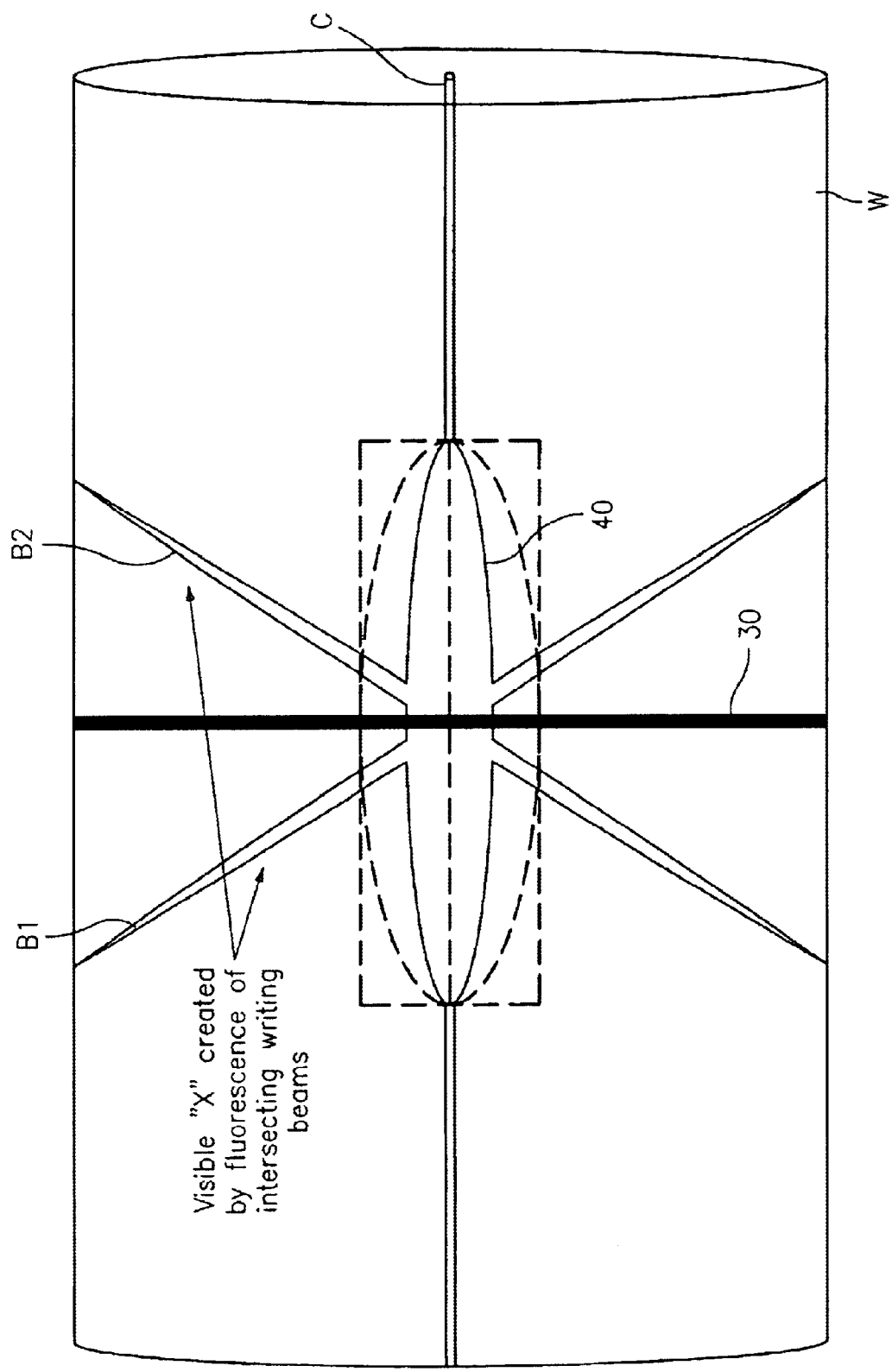
FIG. 3 is a diagram of a large diameter optical waveguide having two beams forming an illuminated "X" centered at an inner core thereof.
Figure 4:
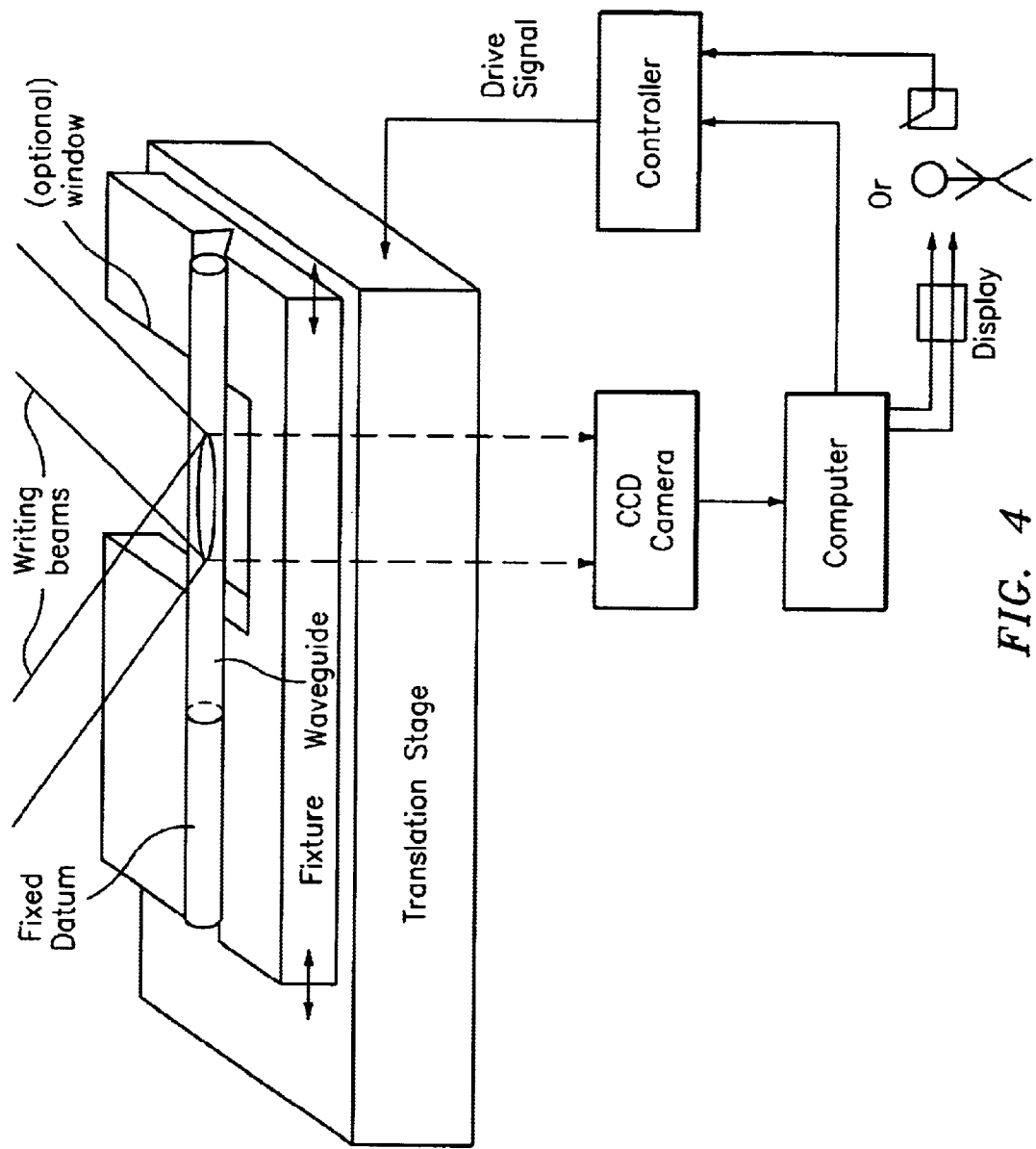
FIG. 4 is a schematic diagram of a system for writing a grating in an optical waveguide having a perspective view of a waveguide fixture or holder device disposed on a translation stage, in accordance with the present invention.

In other words, to determine the peak intensity point (or center) of the intersection of the two writing beams at the beam spot as shown in FIG. 3, a CCD camera (not shown) is focused on the general area of the beam spot. The CCD camera provides a digital image signal to a computer (not shown) which uses a peak intensity detection software and vision alignment software to determine the peak intensity of the beam spot and to align the peak intensity at the scribe mark on the waveguide W. The peak intensity software determines the peak intensity of the beam spot using a Gaussian beam profile model, or other beam profile function model depending on the characteristics of the beam. The peak intensity is determined by placing a shaped template (e.g., rectangle, oval, etc.) over the desired portion of beam spot to be calculated. The template shape determines the window over which intensity data is sampled and should be of a size and shape such that enough data is sampled to accurately calculate the overall beam intensity profile and peak intensity point of the beam spot. A high precision translation stage (e.g., air slide made by Axis) translates the fixture holding the waveguide along the longitudinal or z-axis of the core of the waveguide. The vision alignment software provides feedback to drive the translation stage to actively position the scribe on the waveguide at the location of the peak intensity of the beam spot. This alignment technique can be performed manually or in an automated closed loop process. In addition, this technique can be used for any or all of the alignment axes for the beam spot on the waveguide.

Once the waveguide is in the position at the scribe mark (or calibration point), the translation stage can move the waveguide a predetermined distance from the scribe to the desired position along the z-axis of the waveguide to be able to write a Bragg grating at a precise location along a waveguide. At this point, the calibration of the grating writing system is complete, thereby providing a fixed and repeatable reference point for the grating writing process. The dummy or witness element is then removed and a target waveguide can be placed in the fixture for grating writing to occur. Grating writing can then occur on successive waveguides without recalibration of the grating writing system.

This technique allows for the fabrication of multiple Bragg gratings which are collocated at the same axial position along the waveguide, where the center of each Bragg grating is precisely and repeatably located for each subsequent grating at various Bragg wavelengths. The alignment of the multiple collocated gratings may be such that the center of each of the gratings are at the same axial location, or at any other desired location with respect to each other.

The Mechanical Process

The following is a mechanical process to define a reference location such as scribe 16a or 30 on a fixed placement datum such as 16 arranged on a waveguide fixture device 10 in FIG. 1, and the large diameter optical waveguide in which a grating is to be written in relation to the fixed placement datum, including the steps of:

1. Measure the length of reference cane and divide by two to determine the midpoint of the cane.
2. Precisely scribe a line around the circumference of this cane. This mark is to be used as a reference mark.
3. Accurately measure the aperture width of the cane cardholder or waveguide fixture device. Divide this distance by two to determine the centerline of this aperture.
4. Place atop the upper edge of the cane "V" groove in the cane cardholder or waveguide fixture device a precision etched metal scale (also known as a ruler); position a unit division mark at the calculated/measured centerline of the card holder aperture.
5. Secure the precision etched metal scale to cardholder with Loctite 4210 and allow to cure.
6. Place scribed reference cane in "V" groove and adjust position of the scribed line on the cane to line up with the precision scale division mark that is in alignment with centerline of cardholder.
7. Without disturbing the reference cane position, slide another end polished cane against the reference cane piece. This cane piece is to act as a mechanical stop.
8. Verify that the reference cane position has not been disturbed. Secure the cane stop with Loctite 4210 and allow to cure.
9. Verify that the distances either side of the cane scribe mark to the hard edge of the aperture are equal. If not, repeat the process until desired tolerance is achieved.

Overview

The first and most critical process step by far in the writing of a grating in a large diameter optical waveguide is the alignment of the ultraviolet (UV) beam train. This step necessarily includes the verification (and correction if required) of the UV beam quality and the integrity of the optics. The presently available optics and techniques for focusing the UV beam increase the sensitivities to vibration, Z-distance, and possibly to other conditions that would reduce the fringe visibility at the largest point of the interferometer. The alignment is also the only method that is currently employed to mitigate the various issues, which were detailed previously, created when collocated gratings are not repeatably precision located.

The imaging system, hardware and software described herein provide both alignment tools and grating writing diagnostics. The systems consist mainly of a stably mounted camera and a software package to process the image and provide information to the operator or to another device for controlling the writing process. During the alignment, the system gives the operator an indication of the UV beam position and the error from the calibrated center position. The system also provides information while setting the Z-distance and when aligning the interferometer (phase mask, mirrors, and target holder). With the imaging system and the writing software integrated, the system is capable of determining if the grating is centered in the element. This provides a method of reducing the likelihood of mechanical chirp in the gratings under compression, a condition that would not be detected until final testing at the module level.

The Scope of the Invention

It should be understood that, unless stated otherwise herein, any of the features, characteristics, alternatives or modifications described regarding a particular embodiment herein may also be applied, used, or incorporated with any other embodiment described herein.

For example, although the invention is described in relation to long period gratings, the inventors envision other embodiments using blazed gratings, periodic or aperiodic gratings, or chirped gratings.

Although the invention has been described and illustrated with respect to exemplary embodiments thereof, the foregoing and various other additions and omissions may be made therein without departing from the spirit and scope of the present invention.

What is claimed is:

1. A method for precise and repeatable location of one or more Bragg gratings in a large diameter optical waveguide having a cross-section of at least about 0.3 millimeters, comprising the steps of:

defining a reference location on a fixed placement datum arranged on a waveguide fixture device;

defining one or more desired locations on a large diameter optical waveguide arranged on the waveguide fixture device in relation to the reference location; and writing one or more Bragg gratings in the large diameter optical waveguide at the one or more desired locations based on the reference location on the fixed placement datum.

2. A method according to claim 1, wherein the step of defining the reference location includes:

marking the fixed placement datum with a scribe mark thereon; and securing the fixed placement datum in a groove in a waveguide fixture device.

3. A method according to claim 1, wherein the step of defining one or more desired locations includes:

abutting an end surface of the large diameter optical waveguide against a corresponding end surface of the fixed placement datum.

4. A method according to claim 1, wherein the. step of defining the reference location includes:

viewing the reference location on the fixed placement datum with a camera;

aligning a crosshair of the camera on the reference location; and clicking an icon on a computer program screen to store coordinates of the reference location.

5. A method according to claim 4, wherein the step of defining the reference location includes:

centering axially an intersection of two writing beams on the reference location along the X, Y and Z axis at an inner core of the large diameter optical waveguide; and determining a desired intersection based on the brightness of an illuminated oval.

6. A method according to claim 1, wherein the step of defining the one or more desired locations includes:

viewing the one or more desired locations on the large diameter optical waveguide with a camera;

aligning a crosshair of the camera on the one or more desired locations; and clicking an icon on a computer program screen to store coordinates of the one or more desired locations.

7. A method according to claim 6, wherein the step of defining the one or more desired locations includes:

centering axially an intersection of two writing beams on the reference location along the X, Y and Z axis at an inner core of the large diameter optical waveguide; and determining a desired intersection based on the brightness of an illuminated oval.

8. The optical waveguide of claim 1, wherein said outer dimension of said optical waveguide in the transverse direction is greater than about the dimension selected from the group consisting of 0.5 mm, 0.6 mm, 0.7 mm, 0.8 mm, 1.0 mm, 1.2 mm, 1.4 mm, 1.6 mm, 1.8 mm, 2.0 mm, 2.1 mm, 2.3 mm, 2.5 mm, 2.7 mm, 2.9 mm, 3.0 mm, 3.3 mm, 3.6 mm, 3.9 mm, 4.0 mm, 4.2 mm, 4.5 mm, 4.7 mm, 5.0 mm, 6.0 mm, 7.0 mm, 8.0 mm, 9.0 mm, 1.0 cm, 5.0 cm, 10.0 cm and 20.0 cm.

9. The optical waveguide of claim 1, wherein said length of said optical waveguide along the longitudinal direction is greater than about the dimension selected from the group consisting of 3 mm, 5 mm, 7 mm, 9 mm, 10 mm, 12 mm, 14 mm, 16 mm, 18 mm, 20 mm, 21 mm, 23 mm, 25 mm, 27 mm, 29 mm, 30 mm, 32 mm, 34 mm, 36 mm, 38 mm, 40 mm, 45 mm, 50 mm, 55 mm, 60 mm, 65 mm, 70 mm, 75 mm, 80 mm, 85 mm, 90 mm, 95 mm, 100 mm, 20 cm, 30 cm, 40 cm, 50 cm, and 100 cm.

* * * * *